(12) United States Patent
Feger et al.

(10) Patent No.: US 7,823,930 B2
(45) Date of Patent: Nov. 2, 2010

(54) COUPLING

(75) Inventors: Axel Feger, Lörrach (DE); Michael Trede, Habsheim (FR); Albert Raymond, Claix (FR)

(73) Assignee: A. Raymond et Cie, Grenoble (FR)

( * ) Notice: Subject to any disclaimer, the term of this patent is extended or adjusted under 35 U.S.C. 154(b) by 273 days.

(21) Appl. No.: 11/722,895

(22) PCT Filed: Oct. 13, 2005

(86) PCT No.: PCT/EP2005/010996
§ 371 (c)(1),
(2), (4) Date: Oct. 24, 2007

(87) PCT Pub. No.: WO2006/074719
PCT Pub. Date: Jul. 20, 2006

(65) Prior Publication Data
US 2008/0150280 A1  Jun. 26, 2008

(30) Foreign Application Priority Data
Dec. 27, 2004 (DE) .................. 10 2004 062 887

(51) Int. Cl.
F16L 37/20 (2006.01)
(52) U.S. Cl. ................. 285/319; 285/23; 285/307
(58) Field of Classification Search ............ 285/148.21, 285/305, 307, 308, 311, 317, 319, 320, 23
See application file for complete search history.

(56) References Cited
U.S. PATENT DOCUMENTS
5,297,823 A * 3/1994 Dubost ................. 285/317
5,586,792 A    12/1996 Kalahasthy et al.
5,683,117 A *  11/1997 Corbett et al. .......... 285/24
5,730,481 A *  3/1998 Szabo et al. ........... 285/305

(Continued)

FOREIGN PATENT DOCUMENTS
CN     1066813    4/1997

(Continued)

OTHER PUBLICATIONS
International Preliminary Report on Patentability dated Jul. 3, 2007 in corresponding application PCT/EP2005/010996.

(Continued)

*Primary Examiner*—James M Hewitt
*Assistant Examiner*—Gwendolyn D Fournet
(74) *Attorney, Agent, or Firm*—Baker & Daniels LLP

(57) ABSTRACT

A coupling comprising a receiving part (1), a securing part (9) and an insertion part (17) includes blocking elements (6, 13') whose engagement preventing the securing part (9) from moving from an extended position into a retracted position is released by the axial displacement of latching arms (13) of the securing part (9) under the effect of a retaining ring (22) upon the insertion of said insertion part (17), such that when the insertion part (17) is properly arranged in a receiving space (16) of the receiving part (1), the securing part (9) can be shifted into the retracted position in which said insertion part (17) is secured. What is achieved in this way is relatively simple modification of the assembly force through design measures, high wear resistance, and simple and operationally reliable manipulation of the inventive coupling with regard to the release of the connection between the receiving part and the insertion part, especially under confined spatial conditions.

12 Claims, 4 Drawing Sheets

U.S. PATENT DOCUMENTS

| | | | |
|---|---|---|---|
| 5,951,063 A | 9/1999 | Szabl | |
| 6,293,596 B1 * | 9/2001 | Kinder | 285/305 |
| 6,540,263 B1 * | 4/2003 | Sausner | 285/305 |
| 7,566,077 B2 * | 7/2009 | Tsurumi | 285/93 |
| 7,646,970 B2 * | 1/2010 | Sakaguchi | 396/91 |

FOREIGN PATENT DOCUMENTS

| | | | |
|---|---|---|---|
| EP | 1369634 B1 | 3/2006 | |
| JP | 2004003588 A1 | 12/2003 | |
| WO | WO98/28567 A1 | 7/1998 | |

OTHER PUBLICATIONS

English language translation of International Preliminary Report on Patentability dated Jul. 3, 2007 in corresponding application PCT/EP2005/010996.

* cited by examiner

COUPLING

BACKGROUND OF THE INVENTION

1. Field of the Invention

The invention relates to a coupling.

2. Description of the Related Art

Such a coupling is known from JP 2004003588A. In that prior coupling, the blocking elements of the securing part are implemented as lugs that project inwardly into the receiving space and are formed on radially outwardly bendable latching arms. When the securing part is in the extended position, in which position the latching arms are relaxed, the lugs engage in lug receptacles provided in the wall of the receiving part and thus keep the securing part from moving into the retracted position if the retaining ring of the insertion part is not properly arranged in the receiving part in a manner such that after the retaining ring has been slid up against bevels formed on the lugs in the direction of insertion, the lugs are pressed radially outward by the retaining ring to such an extent that they slide, by additional bevels formed in the direction of displacement, up against mating bevels formed on the wall of the receiving part so that the securing part can be shifted into the retracted position.

Aspects of this prior coupling that have proven somewhat disadvantageous upon frequent operation due to a relatively high sensitivity to wear in the region of the bevels and relatively complex manipulation in shifting the insertion part from the retracted position to the extended position.

SUMMARY OF THE INVENTION

The object underlying the invention is to disclose a coupling of the initially cited kind, which, while evincing a relatively simple modification of assembly force through design measures, is distinguished by high wear resistance and simple and operationally reliable manipulation with regard to the release of the connection between the receiving part and the insertion part, especially under confined spatial conditions.

This object is achieved by the coupling according to the present invention.

By the fact that in the inventive coupling, the engagement of the blocking elements in the extended position of the securing part is released, if the insertion part is properly arranged, by a comparatively large-area impingement of the retaining ring that causes each latching arm to move in the axial direction, and the securing part can thereupon be moved into the retracted position with each latching arm in the respective latching arm receptacle, which can be dimensioned relatively liberally, and the insertion part is securingly locked in this position, it being possible to re-release the lock on the or each latching arm via a simple, respectively opposite movement, the effects are achieved of simple modification of assembly force, relatively low susceptibility to wear, and manipulation that is comparatively simple even under confined spatial conditions and is operationally reliable with regard to the release of the connection.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
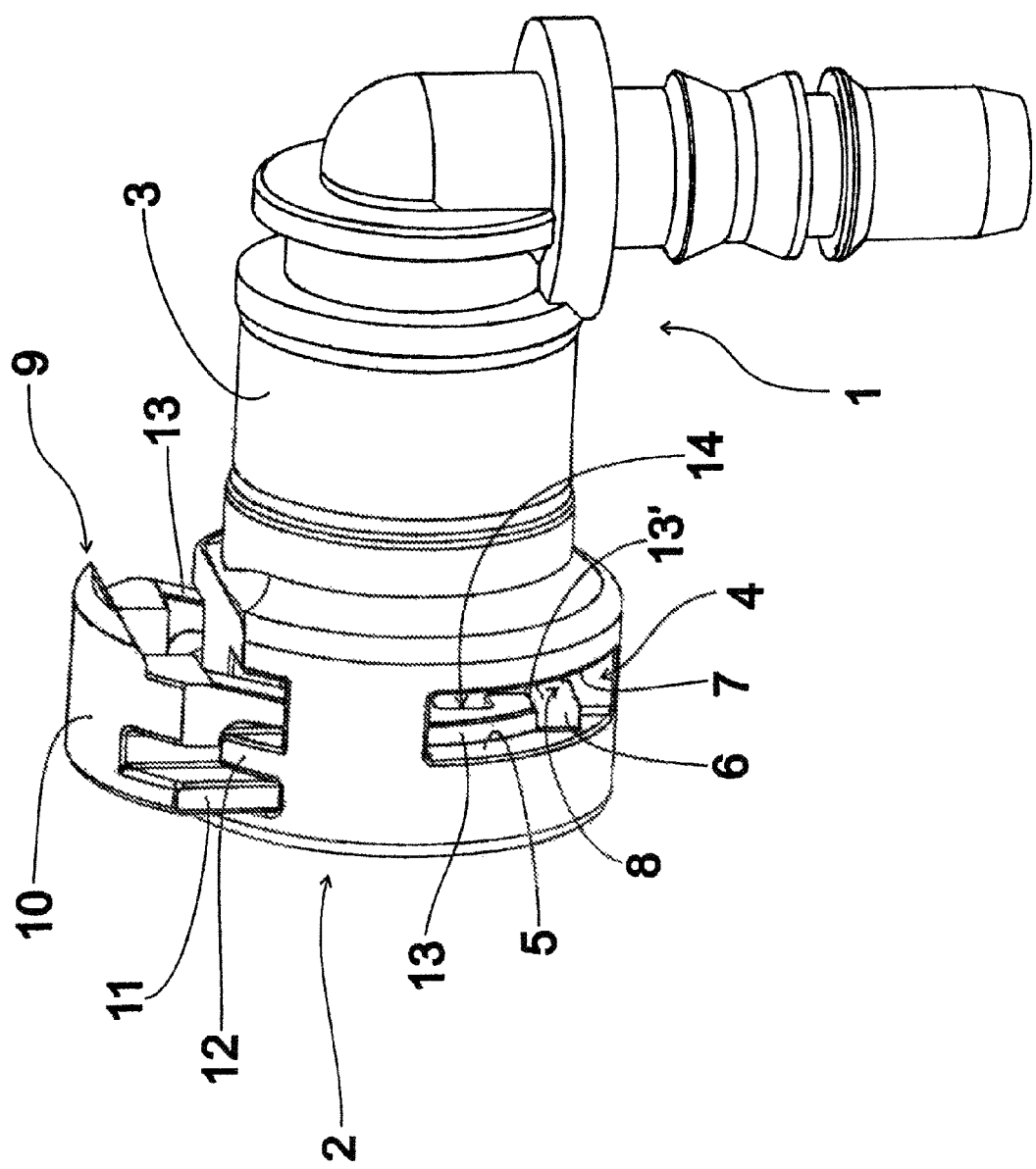
FIG. 1 is a perspective view of a receiving part and a securing part, disposed in an extended position, of an exemplary embodiment of an inventive coupling.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a partially cut-away perspective view of an exemplary embodiment of an inventive coupling. The coupling according to FIG. 1 comprises an angled receiving part 1 made of a hard synthetic material and connectable to an end (not shown in FIG. 1) of a conduit of a fluid supply system. Configured on the receiving part 1, in a region of enlarged cross section disposed next to an insertion side 2 and on both sides of an elongated receiving body 3, are latching arm receptacles 4 that extend perpendicularly to the axial direction of said receiving body 3. Disposed as a blocking element on each of the front walls 5 facing the insertion side 2 is a latching projection 6, which protrudes in the axial direction from the respective front wall 5 and extends in the direction of a back wall 7 disposed opposite the front wall 5, a clearance 8 being formed between the free end of the respective latching projection 6, i.e. that directed away from the insertion side 2, and the associated back wall 7.

The inventive coupling is further provided with a securing part 9, also made of a hard synthetic material, which is configured with a cover portion 10 onto which are formed two mutually oppositely disposed retaining arms 11. Each retaining arm 11 engages in a respective retaining arm receptacle, which is separated from the latching arm receptacle 4 by a partition 12 and is disposed on the side of said latching arm receptacle 4 facing toward the insertion side 2.

In the exemplary embodiment shown, the securing part 9 is further provided with two latching arms 13, which engage in the latching arm receptacles 4 and which, by virtue of the properties of the synthetic material used and/or suitable dimensioning, are flexible in their dimensions in the axial direction. Said latching arms 13 are preferably biased toward the insertion side 2, and thus, in the representation of FIG. 1, bear by their flat sides facing insertion side 2, at least in the region of the operative faces 13' of their free ends, against the front walls 5 of the latching arm receptacles 4.

In the arrangement of receiving part 1 and securing part 9 according to FIG. 1, in which securing part 9 is in an extended position, the operative faces 13' of the free ends of latching arms 13, which faces act as additional blocking elements of the blocking arrangement, bear against the sides facing them of the walls of the latching projections 6, such that by virtue of the preferred bias of latching arms 13 toward insertion side 2, securing part 9 is secured against being displaced into a retracted position.

It can further be recognized from FIG. 1 that formed in the region of the free end of each latching arm 13 is a radially inwardly opening latching projection receptacle 14 that is complementary in shape to the respective latching projection 6.

Figure 2:
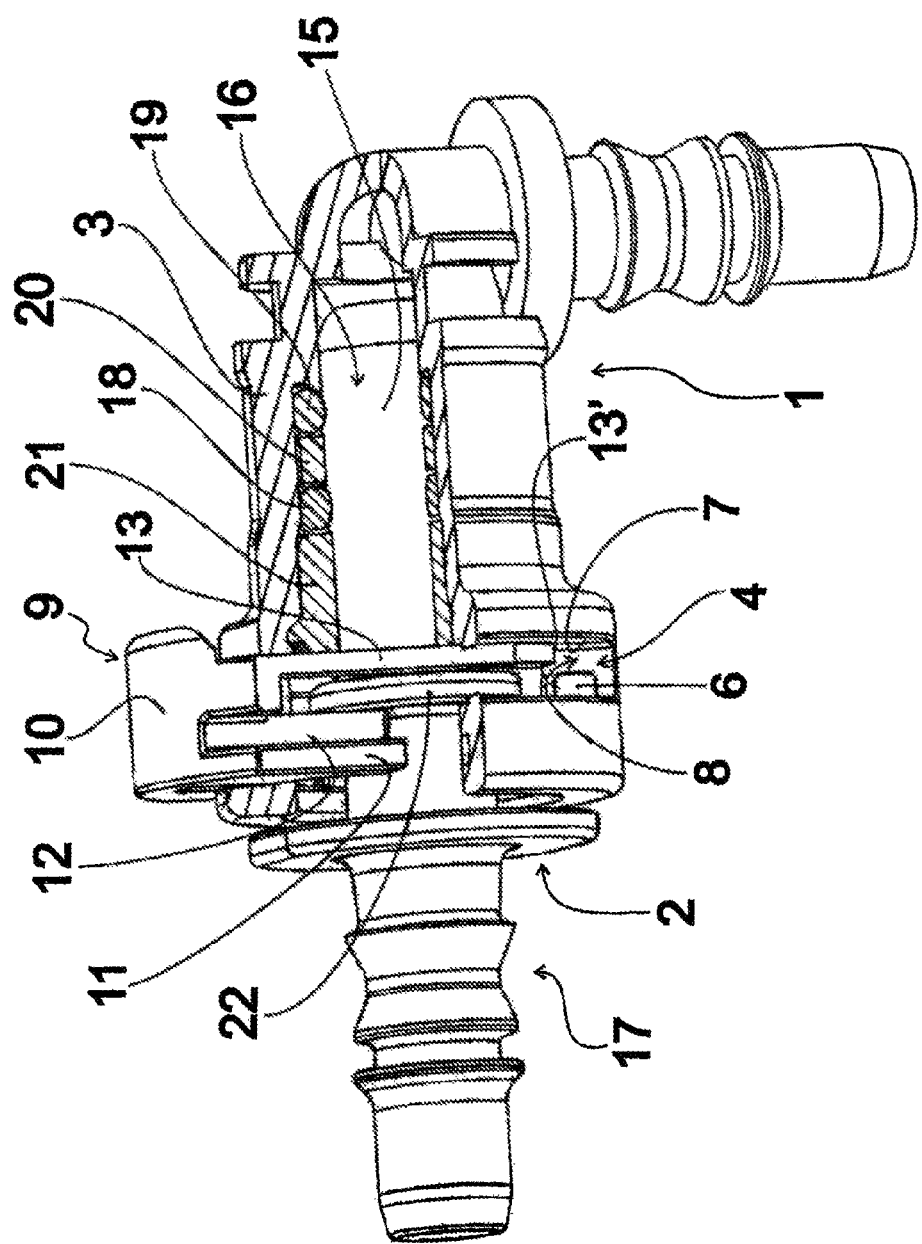
FIG. 2 is a partially cut-away perspective view of the receiving part and the securing part in the arrangement according to FIG. 1, with an insertion part of the inventive coupling inserted into the receiving part.

FIG. 2 is a partially cut-away perspective view of the receiving part 1 and the securing part 9 of the described exemplary embodiment of an inventive coupling in the arrangement according to FIG. 1, with an insertion part 17 inserted by an insertion shaft 15 into a receiving space 16 enclosed by the receiving body 3. The insertion shaft 15 is sealed by means of a sealing arrangement comprising two elastic sealing rings 18, 19, which are held in position by a hard intermediate ring 20 disposed between them and by an internally disposed, fixed spacer ring 21. Insertion part 17 is further configured with a retaining ring 22 that is increased in diameter compared to insertion shaft 15, and with a connecting shaft, configured on the side of retaining ring 22 opposite from the insertion shaft 15, to effect connection to the fluid supply system.

In the arrangement according to FIG. 2, to achieve a proper connection to receiving part 1, insertion part 17 is properly inserted sufficiently deeply into receiving space 16, since only in this arrangement is the engagement of the operative faces 13' of the free ends of latching arms 13 with the latching projections 6, which prevents the securing part 9 from being shifted from the extended position into the retracted position, released as the latching arms 13 move in the axial direction against the bias, away from insertion side 2.

Figure 3:
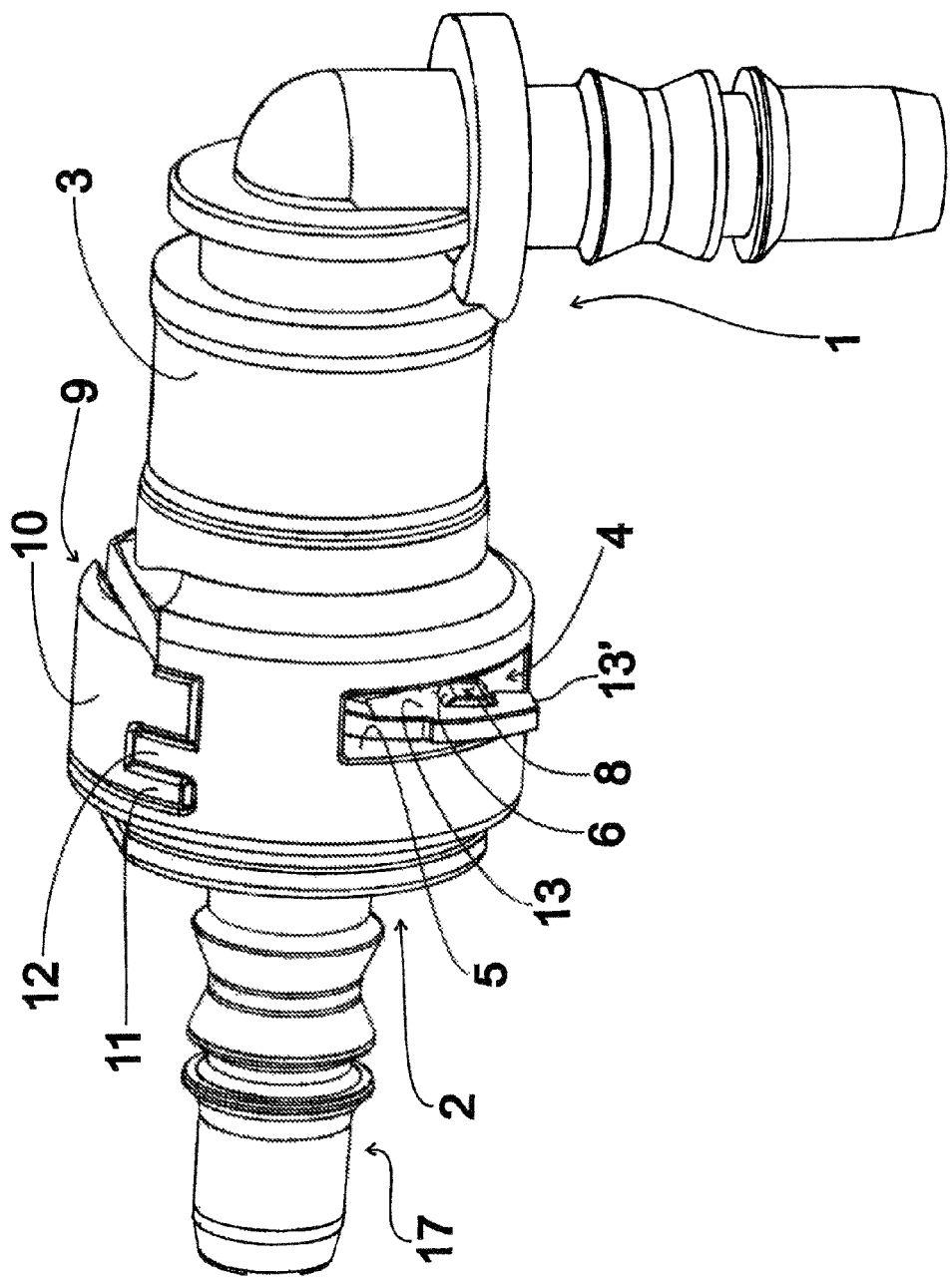
FIG. 3 is a perspective view of the exemplary embodiment according to FIG. 1 and FIG. 2 with the securing part in a retracted position.

FIG. 3 is a perspective view of the exemplary embodiment according to FIGS. 1 and 2 with the securing part 9 in a retracted position. The retracted position was arrived at from the arrangement depicted in FIG. 2 by the exertion of a suitable force on the cover portion 10, causing the latching arms 13 to move through the clearance 8 far enough so that due to the bias of the latching arms 13, the latching projection receptacles 14 came into engagement with the latching projections 6 and fixed the securing part 9 in this retracted position. In the retracted position, the retaining arms 11 engage behind retaining ring 22 and thereby secure insertion part 17 in receiving part 1. To avoid excessive play in this movement, the clearances 8 are usefully configured as only slightly greater in their dimensions in the axial direction than the thickness of the latching arms 13.

It can further be appreciated from FIG. 3 that the free ends of the latching arms 13 project slightly beyond the region of receiving part 1 that is increased in diameter compared to receiving body 3, so that when a force is exerted on the projecting end portions of latching arms 13 in the axial direction away from the insertion side 2, against the bias of said latching arms 13, the engagement between the latching projections 6 and the latching projection receptacles 14 is released, and by the exertion of an additional force oriented perpendicularly to this unlatching force and aimed in the direction of cover portion 10, securing part 9 can be shifted from the retracted position into the extended position, in which insertion part 17 can again be withdrawn from receiving part 1.

This requirement of dual application of force in different directions and separated in time sequence makes for a very operationally reliable connection between receiving part 1 and insertion part 17, with which inadvertent release is a virtual impossibility.

Conversely, should securing part 9 not be shifted from the arrangement of FIG. 2 into the retracted position of FIG. 3, the then relatively high bias of latching arms 13 causes insertion part 17 to be expelled against the direction of insertion, toward insertion side 2. High reliability of assembly is achieved in this way.

Figure 4:
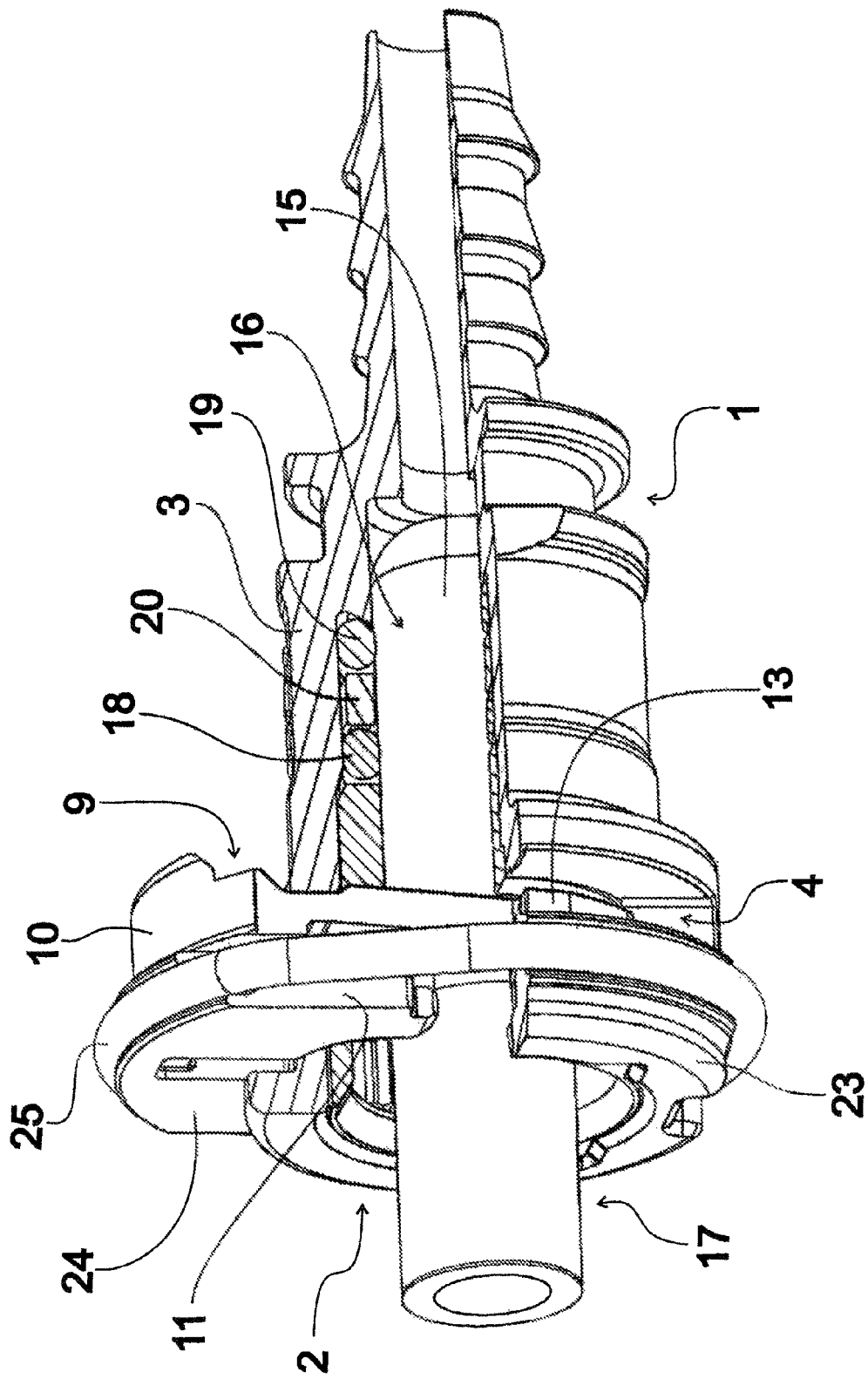
FIG. 4 is a perspective view of another embodiment of the invention with the securing part in an extended position, and an elastic securing ring disposed around the securing part.

FIG. 4 is a perspective view of an improvement of the exemplary embodiment according to FIGS. 1 to 3 in an extended position of securing part 9, receiving part 1 being configured as straight. Elements that are the same in the exemplary embodiment according to FIGS. 1 to 3 and the improvement according to FIG. 4 are provided with the same respective reference numerals, insofar as they appear in the representation of FIG. 4, and will not be described further below.

In the improvement according to FIG. 4, receiving part 1 is configured at insertion side 2 with a radially thickened sealing collar 23, while securing part 9 is equipped on its side facing insertion side 2 with a receiving prolongation 24. Both the sealing collar 23 and the receiving prolongation 24 are configured with a circumferentially extending depression in which an elastic securing ring 25 in the form of an O-ring is seated as a biasing means.

In the arrangement according to FIG. 4, securing part 9 thus is biased by securing ring 25 such that when insertion part 17 is properly inserted into receiving part 1, securing part 9 automatically moves into the retracted position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A coupling, comprising:
   a receiving part including an insertion side and an elongated receiving space defining an axial insertion direction, a latching arm receptacle defined between front and rear walls disposed perpendicular to said insertion direction and spaced from one another along said insertion direction, said front wall disposed closer to said insertion side than said rear wall, and a latching projection and a clearance disposed within said latching arm receptacle between said front and rear walls and adjacent one another along said insertion direction, said latching projection projecting from said front wall into said latching arm receptacle, and said clearance disposed between said latching projection and said rear wall;
   an insertion part insertable into said receiving space along said insertion direction, said insertion part including a retaining ring;
   a securing part including a retaining arm and a latching arm spaced from one another along said insertion direction, said latching arm disposed in said latching arm receptacle and biased toward said front wall and, when not engaged by said retaining ring, contacting said front wall, said securing part movable perpendicularly to said insertion direction between an extended position and a retracted position in which, in a first position of said retaining ring corresponding to incomplete insertion of said insertion part into said receiving space, said latching projection blocks said latching arm to prevent said securing part from moving from said extended position to said retracted position and, in a second position of said retaining ring corresponding to complete insertion of said insertion part into said retaining space, said retaining ring engages said latching arm to flex said latching arm in said insertion direction to move said latching arm into said clearance and permit movement of said securing part into said retracted position, in which said retaining arm engages said retaining ring on a side of said retaining ring opposite said latching arm.

2. The coupling of claim 1, wherein said clearance is substantially equal to a thickness of said latching arm.

3. The coupling of claim 1, wherein said latching arm includes a latching projection receptacle engageable about said latching projection when said securing part is in said retracted position, said latching projection receptacle facing radially inwardly with respect to said insertion direction.

4. The coupling of claim 1, including a biasing member connecting said securing part and said receiving part, said biasing element biasing said securing part towards said retracted position.

5. The coupling of claim 4, wherein said biasing element is a resilient ring, said resilient ring encompassing said securing part and said receiving part.

6. A coupling, comprising:
a receiving part including an insertion side and an elongated receiving space defining an axial insertion direction, and a latching arm receptacle defined between front and rear walls disposed perpendicular to said insertion direction and spaced from one another along said insertion direction, said front wall disposed closer to said insertion side than said rear wall, said latching arm receptacle including a latching projection projecting from said front wall and having an axial dimension extending along the axial insertion direction, said latching arm receptacle further having a clearance disposed between said latching projection and said rear wall;
an insertion part insertable into said receiving space along said insertion direction, said insertion part including a retaining ring;
a securing part including a retaining arm and a latching arm spaced from one another along said insertion direction, said latching arm including an end portion disposed in said latching arm receptacle, said securing part movable perpendicularly to said insertion direction between an extended position and a retracted position in which, in a first position of said retaining ring corresponding to incomplete insertion of said insertion part into said receiving space, said latching projection blocks said latching arm to prevent said securing part from moving from said extended position to said retracted position and, in a second position of said retaining ring corresponding to complete insertion of said insertion part into said retaining space, said retaining ring engages said latching arm to flex said end portion of said latching arm in said insertion direction a distance greater than said axial dimension of said latching projection to a position in which said latching arm is aligned with said clearance and thereby permit movement of said securing part into said retracted position, in which said retaining arm engages said retaining ring on a side of said retaining ring opposite said latching arm.

7. The coupling of claim 6, wherein said latching arm receptacle is defined between front and rear walls perpendicular to said insertion direction and spaced from one another along said insertion direction, said latching projection projects from said front wall into said latching arm receptacle, and said clearance is disposed between said latching projection and said rear wall.

8. The coupling of claim 7, wherein said latching arm is biased toward said front wall and, when not engaged by said retaining ring, contacts said front wall.

9. The coupling of claim 6, wherein said clearance is substantially equal to a thickness of said latching arm.

10. The coupling of claim 6, wherein said latching arm includes a latching projection receptacle engageable about said latching projection when said securing part is in said retracted position, said latching projection receptacle facing radially inwardly with respect to said insertion direction.

11. The coupling of claim 6, including a biasing member connecting said securing part and said receiving part, said biasing element biasing said securing part towards said retracted position.

12. The coupling of claim 11, wherein said biasing element is a resilient ring, said resilient ring encompassing said securing part and said receiving part.

* * * * *